United States Patent [19]

Jeserich et al.

[11] 4,060,518
[45] Nov. 29, 1977

[54] MANUFACTURE OF POLYAMIDE FILM-FORMING MATERIALS CONTAINING MAGNESIUM SILICATE

[75] Inventors: Wolfgang-Dieter Jeserich, Frankenthal; Claus Cordes, Weisenheim; Wolfgang Seydl, Frankenthal; Hans-Peter Weiss, Altrip, all of Germany

[73] Assignee: BASF Aktiengesellschaft, Ludwigshafen, Germany

[21] Appl. No.: 620,713

[22] Filed: Oct. 8, 1975

[30] Foreign Application Priority Data

Oct. 25, 1974 Germany .............................. 2450673

[51] Int. Cl.$^2$ .............................................. C08G 69/16
[52] U.S. Cl. .............................. 260/78 L; 260/37 N; 260/78 A; 260/857 TW
[58] Field of Search ...................... 260/78 L, 857 TW

[56] References Cited

FOREIGN PATENT DOCUMENTS 1,225,382  9/1966  Germany.

Primary Examiner—Harold D. Anderson
Attorney, Agent, or Firm—Keil, Thompson & Shurtleff

[57] ABSTRACT

Process for the continuous manufacture of polymeric starting materials for high-grade transparent thin sheeting, wherein a. $\epsilon$-caprolactam is continuously agitated in a first reaction zone under polyamide-forming conditions at temperatures of from 240° to 290° C until at least 20% and preferably at least 35% of the $\epsilon$-caprolactam has reacted, b. magnesium silicate having a particle size of less than 30 $\mu$m is then added to the melt to give magnesium silicate concentrations in the reaction mixture of from 0.0005 to 0.5% and preferably from 0.001 to 0.01%, and c. the melt is then polymerized in further stages to completion until the relative viscosity is from 2.4 to 3.3 and preferably from 2.5 to 2.8.

6 Claims, No Drawings

MANUFACTURE OF POLYAMIDE FILM-FORMING MATERIALS CONTAINING MAGNESIUM SILICATE

Sheeting based on poly-$\epsilon$-caprolactam is noted for a number of excellent properties, including high mechanical strength, a high degree of transparency and gloss. Other properties make possible high and therefore economical processing rates in the manufacture of the sheeting itself and in the subsequent processing stages such as lamination, hot-pressing, printing and packing. However, a prerequisite for achieving such properties is the use of specific starting materials, and it is known that the use of starting materials of relatively high molecular weight is advantageous. This applies in particular to the manufacture of thin polyamide film having a thickness of 50 $\mu$m and less. Hitherto, it has been essential to use polymeric starting materials having a relative viscosity of 4.0 or above. Polyamides based on poly-$\epsilon$-caprolactam and having a relative viscosity of less than 3.1 make possible only very slow rates of production and processing and furthermore produce film of poor optical properties or insufficient flatness and poor winding properties.

On the other hand, in the continuous manufacture of polyamides in a VK tube viscosities of only 3.1 or less are obtained.

It has therefore been necessary, when manufacturing film-forming materials based on poly-$\epsilon$-caprolactam, to take the product obtained by the VK tube process and, if necessary after the removal of residual monomers and drying, to effect postcondensation thereof according to German Pat. No. 757,294 or German Published Application 1,048,026, in an inert atmosphere, e.g. nitrogen, or in vacuo at temperatures below their melting point for from 3 to 100 hours. Such postcondensation to achieve relative viscosities of 4.0 or higher is very expensive and involves impairment of the color of the polymer and leads to the formation of unevenness and gel particles. To lessen these drawbacks, the process described in German Published Application 1,197,623 uses $\omega$-aminoundecanoic acid as catalyst. German Published Application 1,570,844 proposes specific and expensive shaping of the granules prior to postcondensation and German Published Application 1,179,370 recommends rapid cooling following postcondensation to avoid the said drawbacks. However, these processes involve considerable extra expense and are unsatisfactory.

It is an object of the present invention to provide starting materials for high-grade and transparent polyamide sheeting by continuous polymerization of $\epsilon$-caprolactam, in a particularly economical manner.

It has been found, surprisingly, that excellent starting materials for the manufacture of high-grade and transparent thin sheeting may be obtained when polymerizing $\epsilon$-caprolactam and without resorting to conventional postcondensation to high molecular weights in solid phase, if use is made of the process of the present invention.

This process is characterized in that a. $\epsilon$-caprolactam is continuously agitated in a first reaction zone under polyamide-forming conditions at temperatures of from 240° to 290° C until at least 20% and preferably at least 35% of the $\epsilon$-caprolactam has reacted, b. magnesium silicate having a particle size of less than 30 $\mu$m is then added to the melt to give magnesium silicate concentrations in the reaction mixture of from 0.0005 to 0.5% and preferably from 0.001 to 0.01% and c. the melt is then polymerized in further stages to completion until the relative viscosity is from 2.4 to 3.3 and preferably from 2.5 to 2.8.

It is particularly surprising that high-grade starting materials for sheeting can be obtained by this process, since it is known that the more readily crystallizable low molecular weight polyamides can be processed to sheeting less readily and less economically and give poorer processing properties than polyamides of higher molecular weight, and it is also known, for example from German Patent 1,225,382, that the addition of magnesium silicate assists crystallization of polyamides.

In carrying out the process of the invention, the polyamide-forming starting materials, if necessary together with water, catalysts, chain stoppers and other additives, are melted. In a second stage, the molten starting materials are heated to temperatures of from 240° to 290° C and preferably from 250° to 270° C and are fed to the reactor in which the reaction is to take place. At the same time, or possibly immediately afterward, polymerization begins with consumption of monomer.

The monomeric starting materials used in the present process are $\epsilon$-caprolactam and/or $\epsilon$-aminocaproic acid. It is possible to include other polyamide-forming monomers such as aminocarboxylic acid, lactams thereof and/or salts of dicarboxylic acids and diamines in amounts of up to 20%.

The addition of magnesium silicate to the reaction mixture, as proposed by the present invention, is effected after at least 20% and preferably at least 35% of the caprolactam introduced has reacted, but the melt viscosity is still less than 500 and preferably less than 200 poise. Suitable magnesium silicates are for example natural crystalline magnesium silicates of the serpentine group, fibrous chrysotile asbestos and talcum. We prefer to use white or very light-colored minerals containing only very small amounts of impurities such as iron, aluminum and carbonate. The size of the individual particles is less than 30 $\mu$m. By this we mean that at least 99% of all particles have a size of less than 30 $\mu$m. In a preferred embodiment the particle size is less than 10 $\mu$m.

In a special embodiment, the magnesium silicate is mixed with polyamide in the molten state prior to addition to the reaction mixture. To this end, polyamide, preferably poly-$\epsilon$-caprolactam having a relative viscosity of from 2.4 to 2.7, is melted in, say, conventional extruders and then intimately mixed, in the molten condition, with from 3 to 50% by weight and preferably from 5 to 15% by weight of magnesium silicate so as to give a fine, even dispersion of the solid in the polyamide. The magnesium silicate may be mixed into the molten polyamide in the extruder itself or in separate mixing units such as toothed disc mixers or even static mixers. Particularly good mixing is advantageously effected using mixers in which high shear forces occur. The resulting concentrate or masterbatch may be directly added to the reaction mixture in accordance with the present invention. Alternatively, however, the concentrate may be extruded to strands, cooled and granulated. The resulting granules may be held in storage and added to the reaction mixture when required, e.g. in solid form if desired.

In a preferred embodiment, the concentrate is prepared by melting the polyamide and mixing it with magnesium silicate in self-cleaning twin-shaft extruders of the ZSK type.

It is also advantageous in the process of the invention to effect thorough mixing of the reaction mixture after the addition of the magnesium silicate, in order to achieve uniform dispersion.

In a preferred embodiment, starting materials for the manufacture of sheeting are prepared by the process of the invention in a VK tube. It is particularly advantageous to carry out the process of the invention in VK tubes as described in German Published Application 1,495,198.

Further polymerization of the reaction mixture after the addition of the magnesium silicate may take place at atmospheric pressure or in vacuo. According to the invention, polymerization is continued until relative viscosities of from 2.4 to 3.3 and preferably from 2.5 to 2.8 are obtained. The relative viscosity is calculated as the ratio of the flow times of a 1% solution of polyamide in 96% sulfuric acid and pure 96% sulfuric acid at 25° C in a capillary viscometer. The film-forming materials prepared by the present invention are granulated, extracted by conventional methods and dried to residual moisture contents of less than 0.2%.

Surprisingly, the products thus obtained can be processed, in spite of their low viscosity, to high-grade transparent thin film which, in its properties and processing behavior, is equal or even superior to sheeting obtained from conventional highly viscous starting materials.

The special advantages of the process of the invention consist in that the sheeting materials are prepared exclusively by ring opening in the molten condition without postcondensation at temperatures below the melting point. Apart from the great economical advantage thus achieved in the manufacture of said products, the products themselves show less thermal degradation and have a lighter color and fewer gel particles. In addition, there is no longer any unevenness or fluctuation in the relative viscosity as results from the geometry of the granulated polymer particles, the temperature profile and diffusion processes which occur in thermal aftertreatments. It is no longer necessary to carry out measures as proposed in, say, German Published Applications 1,570,844 and 1,179,370 to achieve optimum properties.

The sheeting materials produced in the process of the invention may be processed to sheeting at much lower temperatures. This means that fewer degradation products are formed on those surfaces of the processing machines which are contacted by the products. Thus the processing plant can be operated for longer on-stream periods between two cleaning operations, and the resulting sheeting contains fewer detrimental degradation products.

The sheeting materials produced in the manner of the invention may be processed to sheeting at surprisingly high production rates and without difficulties, the sheeting being free from fish eyes and homogeneous and, on account of the ease with which it can be handled by machines, allowing highly economical processing rates on hot-pressing plants and similar processing machines.

EXAMPLE 1

200 kg of ε-caprolactam, 1 kg of water and 300 g of propionic acid were melted at 90° C and mixed. The mixture was pumped to a stirred vessel at a rate of 15 l/hr. The stirred vessel was heated to give a temperature of the reaction mixture of 257° C. The weak nitrogen purge maintains a pressure of 1.02 bars. Material was removed from the stirred vessels at such a rate that the volume of reaction mixture therein was held at 70 l. The degree of conversion obtained in said stirred vessel was 47%. The reaction mixture leaving the stirred vessel was passed to a vertical tube containing baffles to achieve substantially plug flow. Heat exchangers installed therein maintained the temperature in the upper third at 270° C, in the second third at 285° C and in the lower third of the tube at 267° C.

The tube had a capacity of 200 l. The molten polymer discharged therefrom was shaped into strands, cooled and granulated. The granules were extracted with water until the residual extract was 0.4%. Following subsequent drying of the granules, the residual moisture content was 0.06% and the relative viscosity 2.55. The material thus produced was processed to flat film.

Preparation of suspension added 1.2 kg of talcum having a particle size of from 3 to 10 μm and a content of iron of less than 0.3% were premixed with 8.8 kg of nylon 6 having a relative viscosity of 2.6, in a mixer, following which the mixture was melted in a twin-shaft extruder ZSK 53 at temperatures ranging from 260° to 270° C, with mixing. The melt was extruded to strands, quenched in a water bath and granulated.

COMPARATIVE EXAMPLE 2

Example 1 was repeated except that the addition of a talcum suspension to the stirred vessel was omitted. The relative viscosity of the resulting product was also 2.55. The resulting granules were processed to flat sheeting.

COMPARATIVE EXAMPLE 3

200 kg of ε-caprolactam and 1 kg of water were melted at 90° C and mixed. The mixture was pumped to a stirred vessel at a rate of 15 l/hr. The stirred vessel was heated so as to give a temperature of the reaction mixture of 257° C. A weak nitrogen purge maintained the pressure at 1.02 bars. Material was removed from the stirred vessel at such a rate that a volume of 70 l of reaction mixture was maintained in the vessel. The degree of conversion in said vessel was 43%. The reaction mixture leaving the stirred vessel was passed to the top of a vertical tube having baffles for the provision of substantially plug flow. Heat exchangers installed therein maintained the temperature in the upper third at 268° C, in the second third at 285° C, and in the lower third at 250° C. The tube had a capacity of 200 l. The molten polymer discharged therefrom was shaped into strands, cooled and granulated. The granules were extracted with water until the residual extract was less than 0.4%. The relative viscosity was 2.93.

The granulated product was then post-treated in a stream of nitrogen for 40 hours at 160° C. The relative viscosity rose to 4.0. The residual moisture content in the granules was less than 0.05%. The resulting granules were processed to flat film.

EXAMPLE 4

200 kg of ε-caprolactam and 14 l of water were mixed at 90° C. The mixture was pumped to a pressure reactor at a rate of 30 kg/hr via a multi-tube heater. The mixture was thus heated to 260° C and was then maintained at this temperature in the reactor for 1 hour at a pressure of 40 bars. The reaction mixture was then discharged from the reactor and flashed. The degree of conversion was 84%. To this mixture there was added a 10% w/w suspension of talcum in aqueous caprolactam solution at a rate of 30 g/hr, based on talcum. The reaction mixture, the steam formed during flashing and the talcum (haul-off speed of the sheeting) was determined at which no trouble occurred. The resulting sheeting was assessed visually as regards homogeneity and content of fish eyes. In addition, the haze value was measured according to ASTM 1003 and the suitability of the sheeting for economic processing on hot presses was assessed. The results are listed in Table 1 below.

TABLE 1

| Product of Example No. | Relative viscosity | Temperature profile over heating zones 1-6 of Barmag extruder (° C) | Temperature of sheeting die (° C) | Maximum haul-off rate of sheeting (m/min.) | Haze value | Homogeneity of sheeting | Suitability for economic processing on hot presses |
| --- | --- | --- | --- | --- | --- | --- | --- |
| 1 | 2.55 | 185/200/230/ 230/230/240 | 240 | 57 | 7.4 | free from fish eyes | very suitable |
| 2 | 2.55 | 185/200/230/ 230/230/240 | 240 | 25 | 4.8 | free from fish eyes | unsuitable |
| 3 | 4.0 | 205/220/250/ 250/250/260 | 260 | 35 | 6.1 | contains fish eyes | very suitable |
| 4 | 2.88 | 190/205/235/ 235/235/245 | 245 | 60 | 13.7 | free from fish eyes | very suitable |
| 5 | 2.50 | 185/200/230/ 230/230/240 | 240 | 54 | 5.3 | free from fish eyes | very suitable | suspension were then passed through a mixing tube which effected intimate mixing of the components. The steam formed was then separated from the reaction mixture and polymerization was carried out in a VK tube as described in German Published Application 1,495,198. The granulated polymers were extracted with water to final contents of extracts of less than 0.4% and then dried to residual moisture contents of less than 0.06%. The relative viscosity was 2.88. The product thus produced was processed to flat film.

EXAMPLE 5

200 kg of ε-caprolactam, 1000 g of water and 300 g of propionic acid were mixed at 90° C. The mixture was pumped to a VK tube of the kind described in German Published Application 1,495,198 at a rate of 15 kg/hr. The mixture in the uppermost reaction zone of the VK tube was heated to 257° C. It remained in this zone for 4.7 hours. The degree of conversion in this reaction zone was 53%. The suspension of talcum in polyamide described in Example 1 was then stirred into the reaction mixture in said reaction zone at a rate of 7.5 g/hr.

Following polymerization in the tubular portion of the VK tube, the relative viscosity of the extracted and dried product was 2.5. The resulting product was processed to flat film.

Sheeting tests on the above products

The products prepared according to Examples 1 to 5 were tested for the manufacture of sheeting. The products were processed in an extruder by BARMAG having a diameter of 90 mm and a length of 25 times the diameter (25 D). The extruder contained a 3-zone worm divided in the ratio of 7:3:15 D. The compression ratio was 14:4.5. The sheeting die used was a conventional die by Johnson having a width of 800 mm. The temperature profile in the heating zone of the extruder and the nozzle was as given in Table 1 below. Under the conditions stated, the maximum possible production rate

We claim:
1. A process for the continuous manufacture of ε-caprolactam polymers for high-grade transparent thin film, which comprises
   a. agitating ε-caprolactam continuously in a first reaction zone under polyamide-forming conditions at temperatures of from 240° to 290° C until at least 20% of the ε-caprolactam has reacted, but the melt viscosity of said reacted ε-caprolactam is still less than 500 poises,
   b. adding magnesium silicate having a particle size of less than 30 μm to the melt to give magnesium silicate concentrations in the reaction mixture of from 0.0005 to 0.5%, and
   c. polymerizing the ε-caprolactam melt at atmospheric pressure or in vacuo to completion until the relative viscosity is from 2.4 to 3.3, said viscosity being calculated as the ratio of the flow times of a 1% solution of polyamide in 96% sulfuric acid and pure 96% sulfuric acid at 25° C in a capillary viscometer.

2. A process as set forth in claim 1, wherein the magnesium silicate is added in the form of a master-batch containing from 3 to 50% based on the weight of said batch by weight of finely divided magnesium silicate in polyamide.

3. A process as set forth in claim 2, wherein the reaction mixture is stirred after the addition of the magnesium silicate.

4. A process as set forth in claim 1, wherein the ε-caprolactam is agitated until at least 35% of said caprolactam has reacted.

5. A process as set forth in claim 1, wherein the magnesium silicate concentrations in the reaction mixture is from 0.001 to 0.1%.

6. A process as set forth in claim 1, wherein the relative viscosity is from 2.5 to 2.8.

* * * * *